(12) United States Patent
Yamaguchi

(10) Patent No.: US 7,602,979 B2
(45) Date of Patent: Oct. 13, 2009

(54) INFORMATION PROCESSING METHOD AND APPARATUS

(75) Inventor: Naohiro Yamaguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 906 days.

(21) Appl. No.: 10/784,816

(22) Filed: Feb. 24, 2004

(65) Prior Publication Data

US 2004/0167918 A1   Aug. 26, 2004

(30) Foreign Application Priority Data

Feb. 25, 2003   (JP)   ............................. 2003-047397
Mar. 4, 2003    (JP)   ............................. 2003-057188

(51) Int. Cl.
*G06K 9/46*   (2006.01)
(52) U.S. Cl. ...................... 382/235; 382/305
(58) Field of Classification Search ................. 382/233, 382/235, 239, 305; 358/1.16, 1.17, 403; 345/532, 555, 567
See application file for complete search history.

(56) References Cited

U.S. PATENT DOCUMENTS

| | | | | |
|---|---|---|---|---|
| 5,159,667 A * | 10/1992 | Borrey et al. | ................ | 715/205 |
| 5,170,466 A * | 12/1992 | Rogan et al. | ................ | 715/530 |
| 5,187,750 A * | 2/1993 | Behera | ........................ | 382/140 |
| 5,257,328 A * | 10/1993 | Shimizu | ...................... | 382/311 |
| 5,388,167 A * | 2/1995 | Koga et al. | ................... | 382/232 |
| 5,432,870 A * | 7/1995 | Schwartz | .................... | 382/232 |
| 5,539,842 A * | 7/1996 | Schwartz | .................... | 382/232 |
| 5,606,649 A * | 2/1997 | Tai | ............................ | 358/1.11 |
| 5,895,455 A * | 4/1999 | Bellinger et al. | .............. | 705/35 |
| 5,978,477 A * | 11/1999 | Hull et al. | ................... | 358/403 |
| 6,115,509 A * | 9/2000 | Yeskel | ........................ | 382/309 |
| 6,427,032 B1 * | 7/2002 | Irons et al. | .................. | 382/306 |
| 6,665,086 B2 * | 12/2003 | Hull et al. | .................. | 358/1.15 |

* cited by examiner

*Primary Examiner*—Yosef Kassa
(74) *Attorney, Agent, or Firm*—Fitzpatrick, Cella, Harper & Scinto

(57) ABSTRACT

This disclosure relates to a technique for automatically selecting compression/non-compression for each digital document upon archiving digital documents. Whether or not each digital document is to be stored in a compressed or non-compressed state is determined based on a predetermined reference. A digital document which is determined to be stored in a compressed state is controlled to be stored in the compressed state, and a digital document which is determined to be stored in a non-compressed state is controlled to be stored in the non-compressed state, thus generating an archive file. This disclosure relates to a technique for determining whether or not each digital document is to be uploaded to a server, and generating an archive file that stores abstract data of uploaded digital documents, and digital documents which are not uploaded, upon archiving digital documents.

35 Claims, 12 Drawing Sheets

F I G. 9
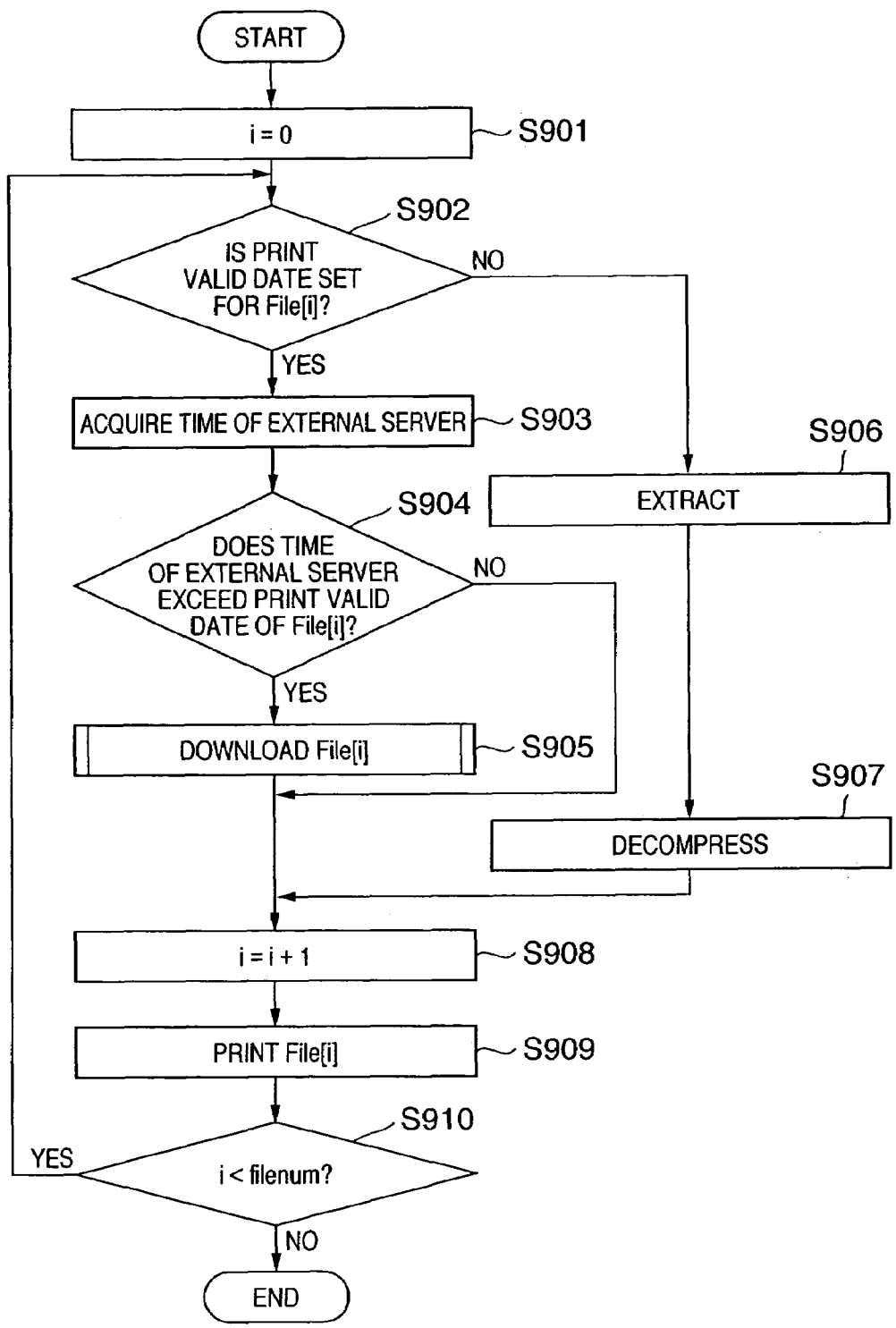

INFORMATION PROCESSING METHOD AND APPARATUS

FIELD OF THE INVENTION

This invention relates to an information processing method and apparatus and, more particularly, to an information processing technique for generating a compressed archive file by compressing a plurality of digital documents.

BACKGROUND OF THE INVENTION

In recent years, companies have adopted document management systems to convert paper documents into digital documents, and have promoted the re-use of these documents. In an early document management system, a paper document is scanned as an image by a scanner, and that image is registered and saved. Recently, however, digital documents created by personal computers have become widespread, and such digital documents can be registered and saved.

Also, in recent years, it is possible to extract arbitrary pages from a plurality of registered digital documents, to compress and archive these pages, and to bind these pages like a binder to form a single digital document (compressed archive file). Such files will also be referred to as digital binders hereinafter. Such digital binders allow editing of internal files, and changing of individual files.

Conventional digital binders, however, suffer the following problems. In the conventional digital binder, in order to acquire the contents of the compressed digital binder, a series of processes for retrieving the entire digital binder onto a memory or as a file, and decompressing that binder are required. However, when data to be frequently accessed by the user is included in the digital binder, the user must decompress that data every time he or she accesses the data. For this reason, a very long time is required to process digital documents bound by the digital binder.

Upon processing the digital binder, a program must assure a large work memory area in advance on a main or sub storage device so as to decompress the compressed digital documents.

Such digital binders can be registered in a database that manages digital binders. The user can execute an edit process, save process, search process, and the like for digital binders registered in the database. One of the important functions of this database is a check-out/check-in function. In some cases, a plurality of users can access an arbitrary digital binder. In such environment, when a given user begins to user that digital binder, he or she can declare the right of edit to other users by setting the digital binder in a check-out state using the check-out function. In this manner, using the check-out function, a single digital binder can be prevented from being opened and edited by a plurality of users at the same time. Upon completion of such edit process, the check-out state is canceled using the check-in function, and a change in digital binder made by the user is reflected on the digital binder on the database. After the check-out state is canceled, other users can edit that digital binder.

In such digital binder management method, however, when a given digital binder is checked out, that digital binder is copied, and the copy of the digital binder undergoes an edit process and the like.

Since the check-out process is made for each digital binder, all digital documents contained in each digital binder can be accessed by acquiring the copy of that digital binder, thus posing a security problem.

Also, illicit copies are easily produced.

SUMMARY OF THE INVENTION

Accordingly, the present invention provides an information processing technique that archives digital documents after compression/non-compression is automatically selected for each digital document.

The exemplary method related to the present invention provides an information processing method for generating an archive file that stores a plurality of digital documents, comprising: a checking step of checking based on a predetermined reference whether each digital document is to be stored in a compressed or non-compressed state; and a generation step of generating the archive file by controlling to store a digital document, which is determined in the checking step to be stored in a compressed state, in the compressed state, and controlling a digital document, which is determined in the checking step to be stored in a non-compressed state, in the non-compressed state.

Since compression/non-compression is determined based on a predetermined reference upon binding digital documents by a digital binder, the file size can be reduced while shortening the processing time required for expansion.

It is another object of the present invention to provide an information processing technique that can improve the security of a digital binder.

According to the present invention, the foregoing object is attained by providing, for example, an information processing method for generating an archive file that stores a plurality of digital documents, comprising: a checking step of checking based on a predetermined condition if each digital document main body is to be uploaded to a server; an abstract generation step of generating abstract data of the digital document which is determined in the checking step to be uploaded; an upload step of uploading the digital document, which is determined in the checking step to be uploaded, to the server; and an archive file generation step of generating an archive file which stores the abstract data of the digital document which is determined in the checking step to be uploaded, and a digital document which is determined in the checking step not to be uploaded.

The invention is particularly advantageous since the security of the digital binder can be improved.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a flow chart upon printing digital documents in the digital binder generated in FIG. 8;

DETAILED DESCRIPTION OF THE PREFERRED EMBODIMENTS

Preferred embodiments of the present invention will now be described in detail in accordance with the accompanying drawings.

Figure 1:
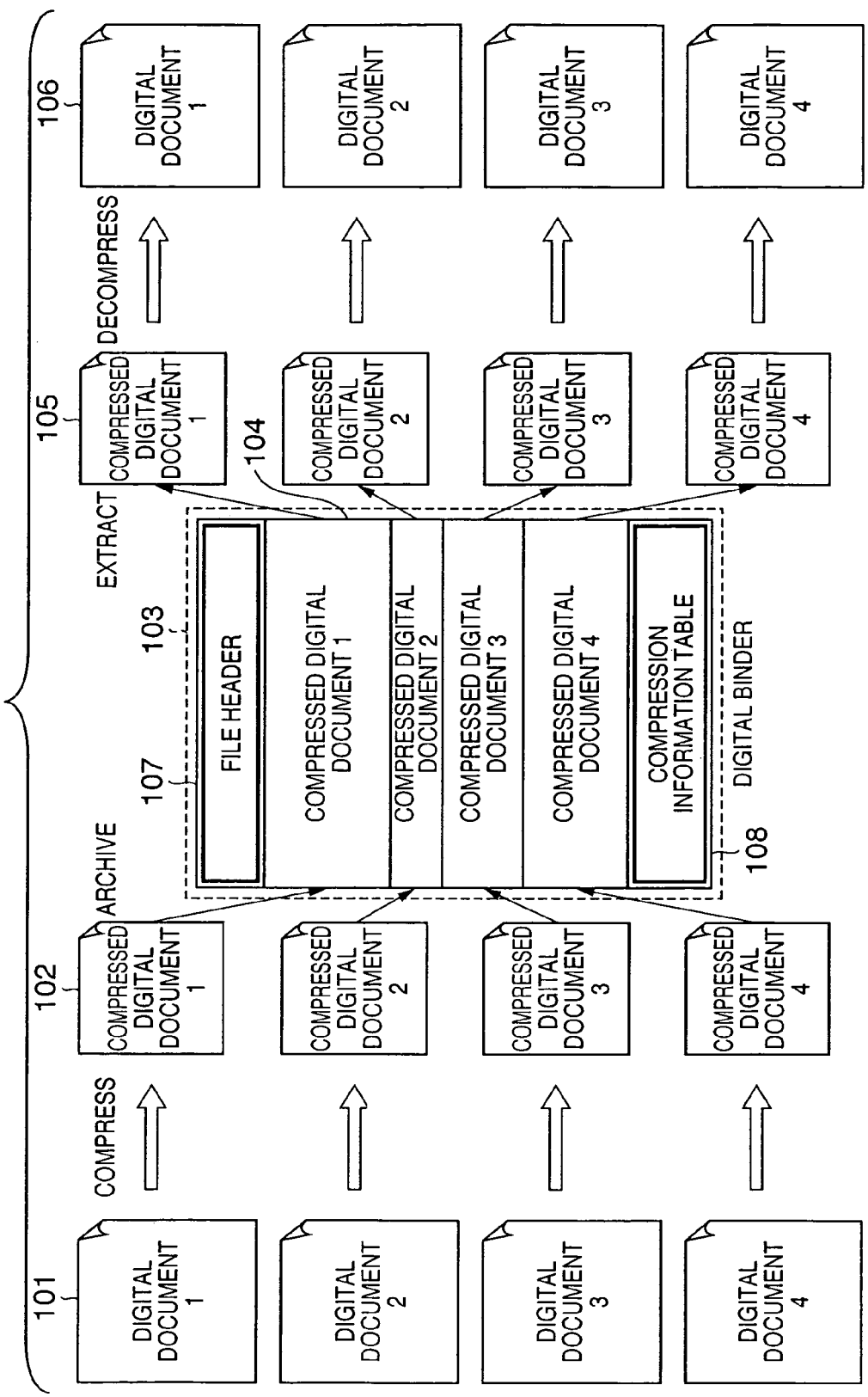
FIG. 1 is a schematic view of a document management system.

FIG. 1 is a schematic view of a digital binder (archive file) and digital documents bound by that binder according to an embodiment of the present invention. Digital documents 101 include various application files. The digital documents 101 are compressed to generate compressed digital documents 102, and these documents 102 are archived to generate a digital binder 103. Various compression schemes may be used in compression. In this embodiment, compression is made using a predetermined reversible compression algorithm.

In FIG. 1, a file header 107 stores information of a digital binder itself, and information such as a date of creation and the like. A compression information table 108 stores information associated with the addresses of compressed digital documents 104 contained in the digital binder 103, and each compressed digital document 104 can be accessed with reference to this address.

In order to decompress each compressed digital document 104 bound by the digital binder 103 to a state in which an application can process that document, the document 104 is extracted from the digital binder 103 as a compressed digital document 105. The compressed digital document 105 undergoes a decompression process using a decompression algorithm corresponding to the compression scheme used in compression to generate a digital document 106.

First Embodiment of Compression/non-compression Determination Process

Figure 2:
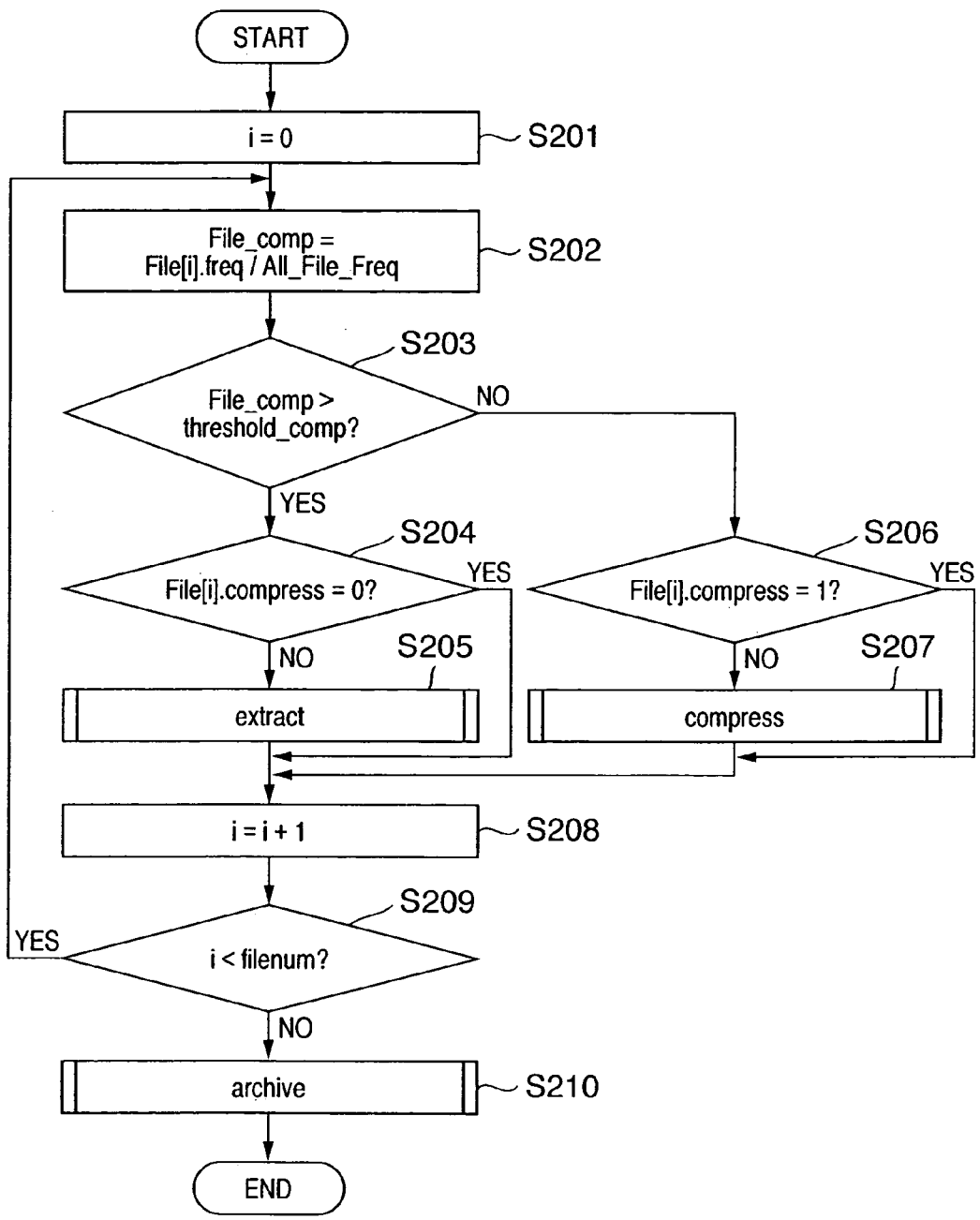
FIG. 2 is a flow chart showing a digital binder generation process on the basis of the access frequencies of respective digital documents according to an embodiment of the present invention.

FIG. 2 is a flow chart showing a process for automatically determining compression/non-compression for each digital document on the basis of the access frequencies of respective digital documents, and archiving the digital documents after a compression process and the like, upon compressing and archiving the digital documents.

In step 201, digital document number i is reset to zero to start a checking process from the first digital document.

In step 202, File_comp is obtained by dividing the access frequency of the i-th digital document by the total access frequency All_File_freq to calculate the ratio of accesses to file i to those to all files. When the value All_File_freq is smaller than a predetermined value, since it is statistically nonsense, File_comp is set to be "1".

It is checked in step 203 whether or not digital document i is frequently accessed, to see if File_comp>a predetermined threshold value threshold_comp. If it is determined that digital document i is frequently accessed, the flow advances to step 204. If it is determined that digital document i is accessed not so frequently, the flow advances to step 206.

It is checked in step 204 if a compression flag of digital document i is true or false, i.e., if that digital document has already been compressed. If digital document i has already been compressed, the flow advances to step 205 to decompress that document using a decompression algorithm corresponding to a predetermined compression algorithm used in compression. If digital document i is not compressed, the flow jumps to step 208.

It is checked in step 206 if a compression flag of digital document i is true or false, i.e., if that digital document has already been compressed. If digital document i is not compressed, the flow advances to step 207 to compress that document according to the predetermined compression algorithm. If digital document i has already been compressed, the flow jumps to step 208.

In step 208, i is incremented by 1 to select the next document to be processed.

The current digital document number i and the total number filenum of files are compared in step 209 to check if all digital documents have been checked. If i<filenum, the flow returns to step 202 to check the next digital document. If i≧filenum, i.e., if it is determined that all the digital documents have undergone the compression/non-compression determination process, the flow advances to step 210. In step 210, all the digital documents undergo an archive process (bind process) to generate a digital binder.

Second Embodiment of Compression/non-compression Determination Process

Figure 3:
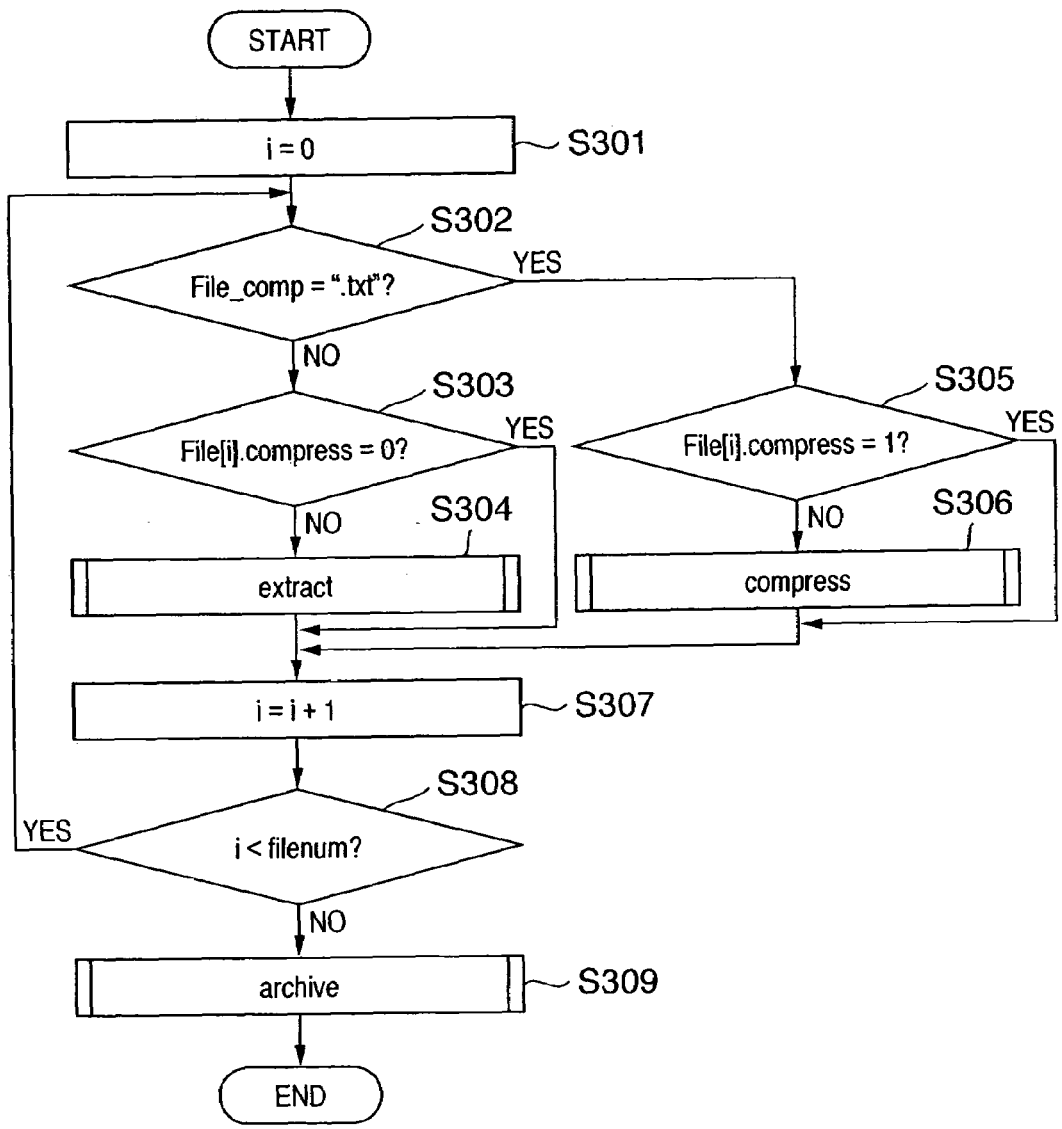
FIG. 3 is a flow chart showing a digital binder generation process on the basis of properties for respective formats of digital documents according to an embodiment of the present invention.

FIG. 3 is a flow chart showing a process for checking the format of each digital document with reference to the extension of that digital document, automatically determining compression/non-compression for each digital document on the basis of the properties for respective digital documents, and archiving the digital documents, upon compressing and archiving the digital documents.

In step 301, digital document number i is reset to zero to start a checking process from the first digital document.

In step 302, File_comp represents the format type of digital document i. It is checked in step 302 if File_comp is a predetermined format (text format in this embodiment). Some digital documents have already been compressed in a unique format, and the compression efficiency cannot be improved if such digital documents are re-compressed. For this reason, it is checked if the type of digital document i is a specific type. That is, if digital document i is a non-compressed digital document or a digital document of a type which can be re-compressed to improve the compression efficiency, the flow advances to step 305. On the other hand, if digital document i is a digital document which cannot improve the compression efficiency if it is compressed, the flow advances to step 303.

It is checked in step 303 if a compression flag of digital document i is true or false, i.e., if that digital document has already been compressed. If digital document i has already been compressed, the flow advances to step 304 to decompress that document using a decompression algorithm corresponding to a predetermined compression algorithm used in compression. If digital document i is not compressed, the flow jumps to step 307.

It is checked in step 305 if a compression flag of digital document i is true or false, i.e., if that digital document has already been compressed. If digital document i is not compressed, the flow advances to step 306 to compress that document according to the predetermined compression algorithm. If digital document i has already been compressed, the flow jumps to step 307.

In step 307, i is incremented by 1.

The current digital document number i and the total number filenum of files are compared in step 308 to check if all digital documents have been checked. If i<filenum, the flow returns to step 302 to check the next digital document. If i≧filenum, i.e., if it is determined that all the digital documents have undergone the compression/non-compression determination process, the flow advances to step 309.

In step 309, all the digital documents undergo an archive process (bind process) to generate a digital binder.

Third Embodiment of
Compression/non-compression Determination
Process

Figure 4:
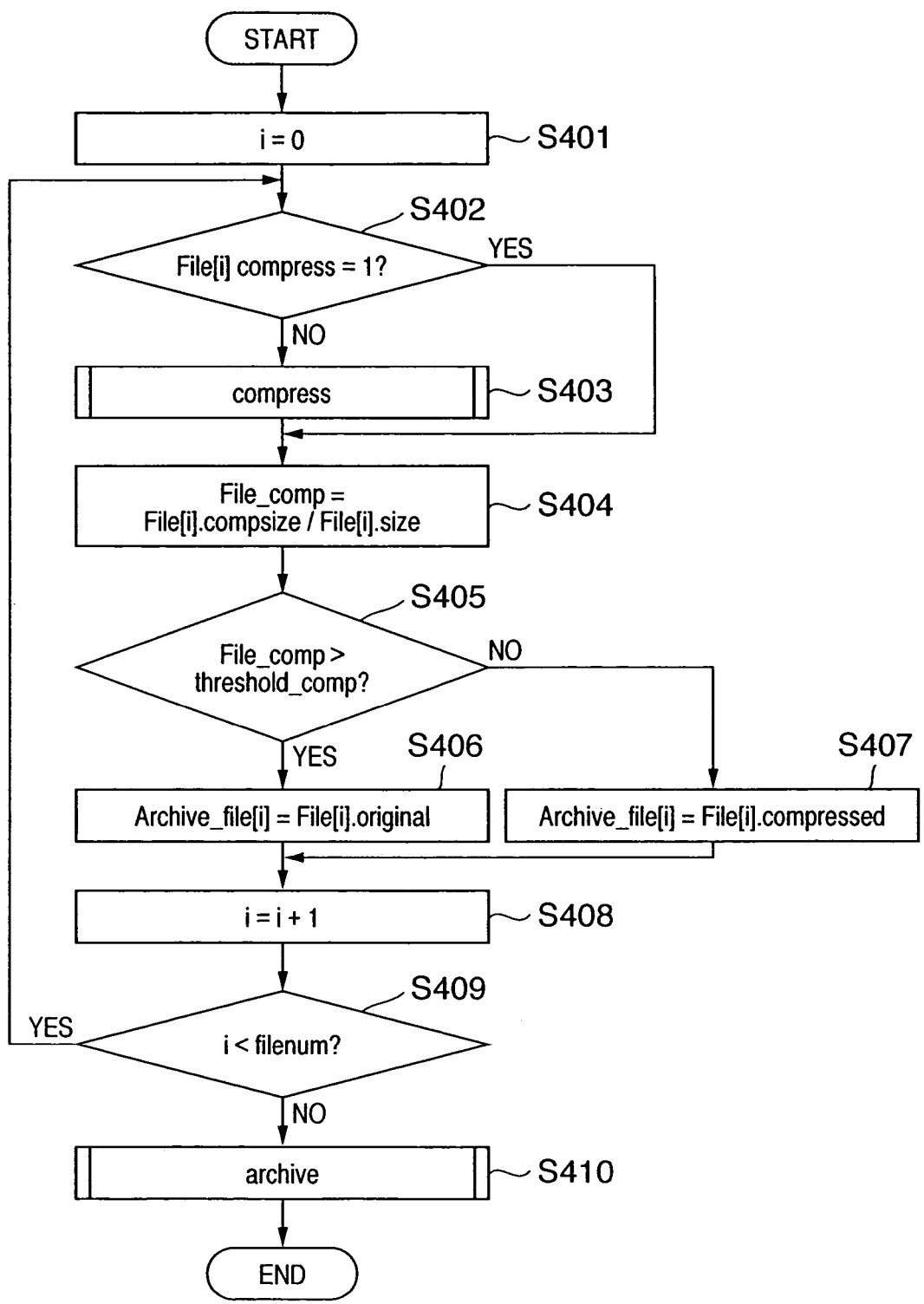
FIG. 4 is a flow chart showing an archive file generation process on the basis of the compression ratios of respective compressed digital documents according to an embodiment of the present invention.

FIG. 4 is a flow chart showing a process for automatically determining compression/non-compression for each digital document on the basis of the compression ratios of respective digital documents, and archiving the digital documents, upon compressing and archiving the digital documents.

In step 401, digital document number i is reset to zero to start a checking process from the first digital document.

It is checked in step 402 if a compression flag of digital document i is true or false, i.e., if that digital document has already been compressed. If it is determined that digital document i is not compressed, the flow advances to step 403 to compress that document according to a predetermined compression algorithm. If it is determined that digital document i has already been compressed, the flow jumps to step 404.

In step 404, File_comp is obtained by dividing the compressed size of digital document i by its non-compressed size to calculate the compression ratio of digital document i. As this value is smaller, the document of interest is a compressed digital document with a higher compression ratio.

It is checked in step 405 if File_comp>a predetermined threshold value threshold_comp. If File_comp>threshold_comp, it is determined that digital document i has a low compression ratio, and the flow advances to step 406. Conversely, if digital document i has a high compression ratio, the flow advances to step 407.

In step 406, it is determined that the compression efficiency is not improved if document i is compressed, and an original digital document before compression is set as a file to be archived. The flow then advances to step 408.

In step 407, it is determined that digital document i has high compression efficiency, and a digital document after compression is set as a file to be archived. The flow then advances to step 408.

In step 408, i is incremented by 1. The current digital document number i and the total number filenum of files are compared in step 409 to check if all digital documents have been checked. If i<filenum, the flow returns to step 402 to check the next digital document. If i≧filenum, it is determined that all the digital documents have undergone the compression/non-compression determination process, and the flow advances to step 410.

In step 410, all the digital documents undergo an archive process (bind process) using digital documents (non-compressed documents) selected in step 406 and those (compressed documents) selected in step 407 to generate a digital binder.

(Concept of Compression/non-compression Determination Process)

Figure 5:
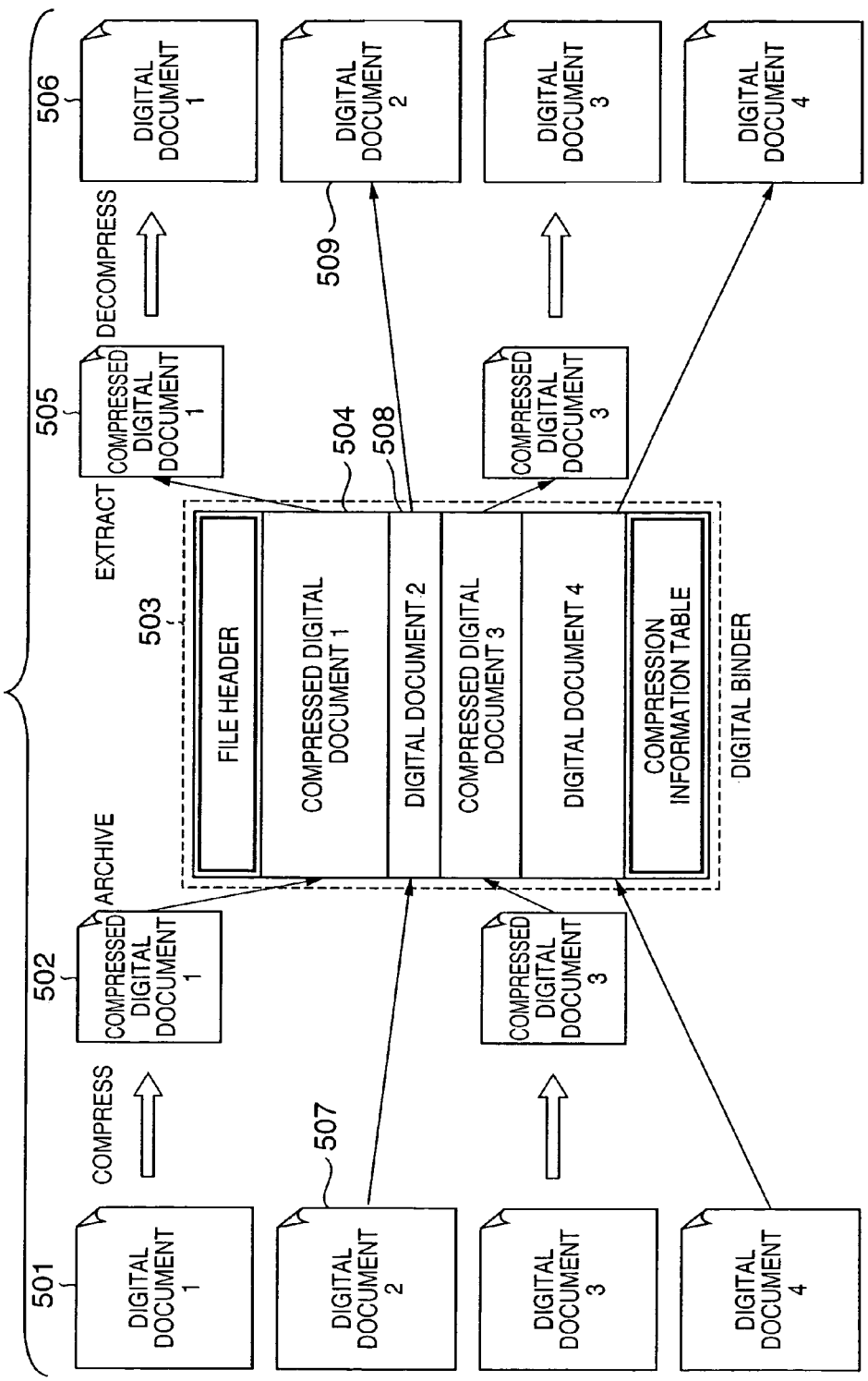
FIG. 5 is a view showing an example of the internal configuration, and a compression/archive process and extraction/decompression process of a digital binder according to the present invention.

FIG. 5 is a schematic view showing a process for generating a digital binder 503 by archiving compressed digital documents 502 generated by compressing digital documents 501, and non-compressed digital documents 507 together upon archiving digital documents using the method of the present invention (step 210 in FIG. 2, step 309 in FIG. 3, step 410 in FIG. 4), and a process for extracting compressed digital documents 505 and non-compressed digital documents 509 from the digital binder 503.

A digital document 501 is determined to be archived in a compressed state when it is checked based on the above reference. The digital document 501 is compressed according to a predetermined compression algorithm to generate a compressed digital document 502. A digital document 507 is determined not to be compressed when it is checked based on the above reference. Digital documents including these compressed/non-compressed documents together are archived to generate a digital binder 503. Upon archiving, information associated with each digital document (address information indicating the location of each digital document, size information, information indicating compression/non-compression, and the like) is stored in a compression information table of the digital binder 503.

In order to process compressed digital documents 504 and non-compressed digital documents 508 in the digital binder 503 by an application, compressed digital documents 505 and non-compressed digital documents 509 are extracted. Each compressed digital document 505 is decompressed in accordance with a decompression algorithm corresponding to the compression algorithm used in compression to generate a digital document 506. When each non-compressed digital document 508 is processed, a non-compressed digital document 509 is temporarily extracted. Alternatively, the application can execute a process by directly accessing the start address of the non-compressed digital document 508 with reference to the compression information table.

As described above, according to the above embodiments, since compression/non-compression is determined based on a predetermined reference upon binding digital documents by a digital binder, the file size can be reduced while shortening the processing time required for decompression.

Also, according to the above embodiments, since an unnecessary compression/expansion process for digital documents bound by the digital binder is skipped, the processing time of digital documents bound by the digital binder can be shortened.

Furthermore, according to the above embodiments, upon processing digital documents bound by the digital binder, since a process can be done by directly accessing each non-compressed digital document in the digital binder, the processing area to be assured on the main and sub storage devices can be saved.

Embodiment About Improvement of Security

Figure 6:
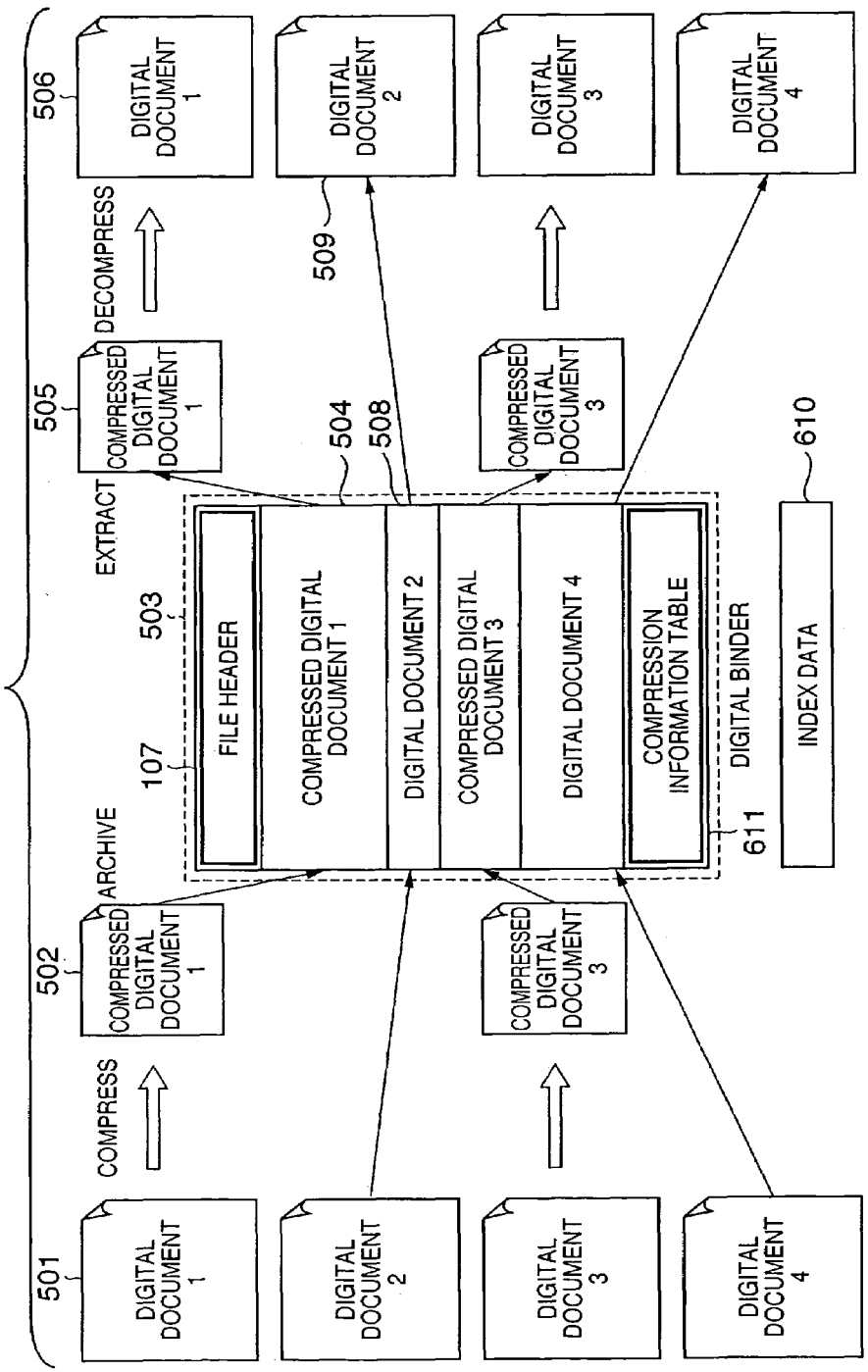
FIG. 6 is a schematic view showing a digital binder (archive file) according to an embodiment of the present invention, and digital documents bound by that binder.

FIG. 6 is a schematic view showing a digital binder (archive file) that can be handled by an information processing apparatus according to an embodiment of the present invention, and digital documents bound by that binder. The same reference numerals denote the already explained parts, and a description thereof will be omitted. A compression information table 611 stores information associated with the addresses of compressed digital documents 504 and non-compressed digital documents 508 included in a digital binder 503. With reference to these addresses, the compressed digital documents 504 and non-compressed digital documents 508 can be accessed. In order to decompress each compressed digital document 504 bound by the digital binder 503, it is extracted as a compressed digital document 505 from the digital binder 503. The compressed digital document 505 undergoes a decompression process using a decompression algorithm corresponding to the compression scheme used in compression, thus generating a digital document 506.

In case of the non-compressed document 508, a digital document 509 can be extracted by acquiring its file offset and file size. Abstract text data (index data) 610 is generated using text data of each digital document 501. Since this data indicates the contents of digital documents included in the digital binder 503, when the digital documents 504 and 508 have been updated, it can be updated while reflecting their contents.

Figure 7:
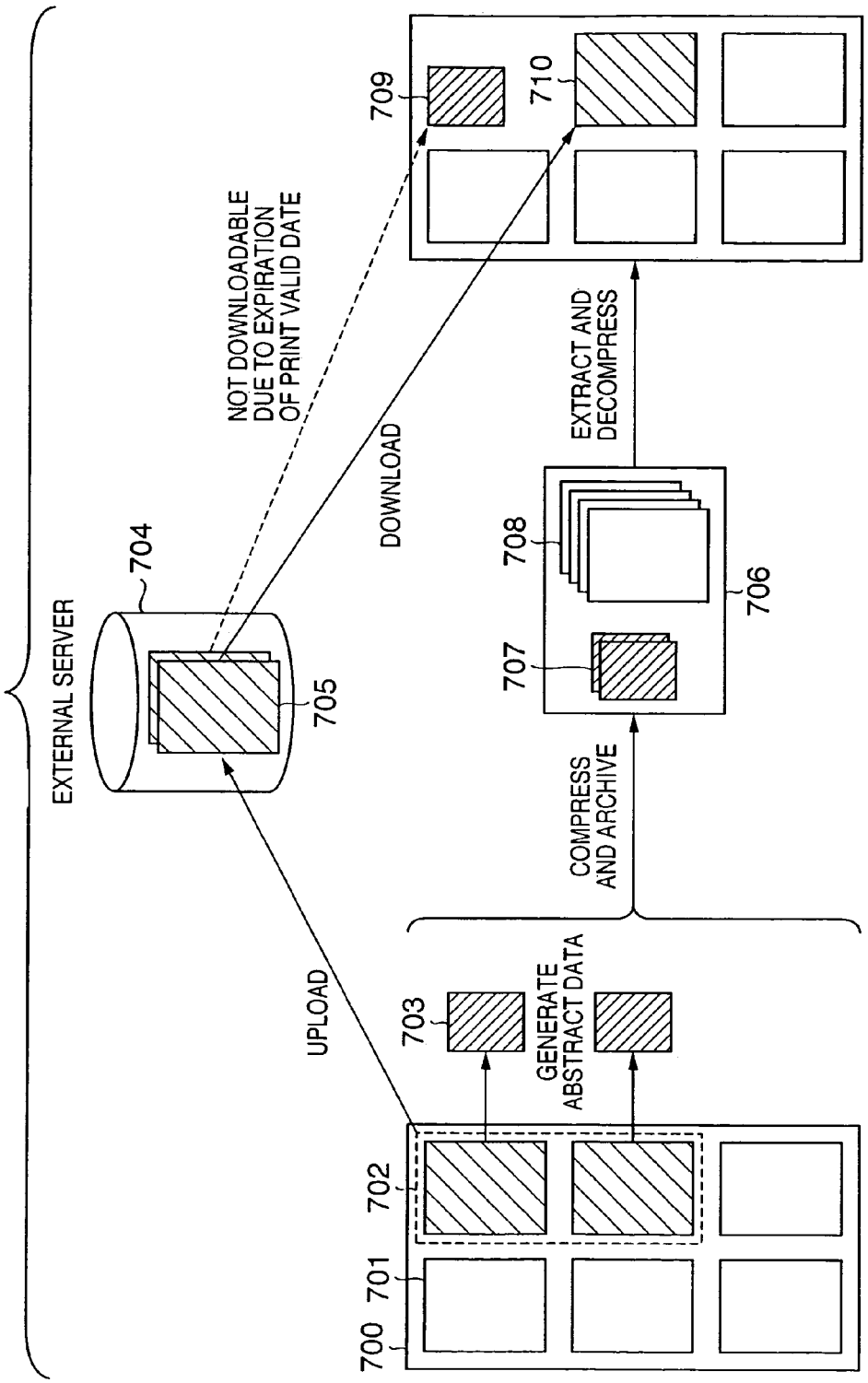
FIG. 7 is a schematic view showing an example of the configuration of a digital binder according to the present invention.

The information processing apparatus of this embodiment can handle the digital binder shown in FIG. 6. Also, the present invention can achieve processes shown in FIG. 7. FIG. 7 is a schematic view showing a process for determining digital documents 702 whose main bodies are not to be archived using some condition to be described later, generating abstract data 703 of the digital documents 702 which are not to be archived, uploading the documents which are not to be archived to an external server 704 without being archived in a digital binder 706, and generating a digital binder 706 by compressing and archiving digital documents 701 which are not updated, and the abstract data 703, and a process for downloading digital documents 705 that have been uploaded to the external server 704 to restore digital documents to an editable state.

Details of the above processes will be described below. Upon generating a digital binder 706 from digital documents 700, some documents included in the digital documents 700 are categorized on the basis of a predetermined condition into digital documents 701 which are compressed and archived to form the digital binder, and digital documents 702 which are not suited to be archived in the digital binder.

The digital documents 702 are uploaded to the external server 704, and are saved as uploaded digital documents 705. Also, abstract data 703 associated with the digital documents 702 to be uploaded are generated.

The digital binder 706 is formed by compressing and archiving the digital documents 701 and abstract data 703.

Normally, upon browsing a digital binder, if the binder stores a digital document, an application which can browse that digital document and is associated with it is launched. Likewise, when the binder includes abstract data, an application is similarly launched to display abstracts and outlines of uploaded digital documents. Digital documents included in the digital binder 706 can be edited, printed, or searched by launching the application. If the original digital document 702 has been uploaded and the binder has only its abstract data 703, the digital document 705 must be downloaded from the external server 704 to execute an edit process, print process, search process, and the like.

When the digital document 705 is downloaded, processes such as an edit process and the like are allowed. However, the digital document 705 cannot often be downloaded depending on a condition set upon uploading or a state upon downloading (e.g., out of valid date). In such cases, only its abstract data 709 is displayed, and processes such as an edit process and the like are inhibited.

A practical example will be explained below.

<Process Associated with Digital Binder that Stores Digital Documents given with Valid Dates>

Generation and use of a digital binder which can improve security by limiting use of digital documents by giving valid dates to them will be explained. Note that a print valid date is used as the valid date, but other valid dates (e.g., a browse valid date and the like) may be used.

Figure 8:
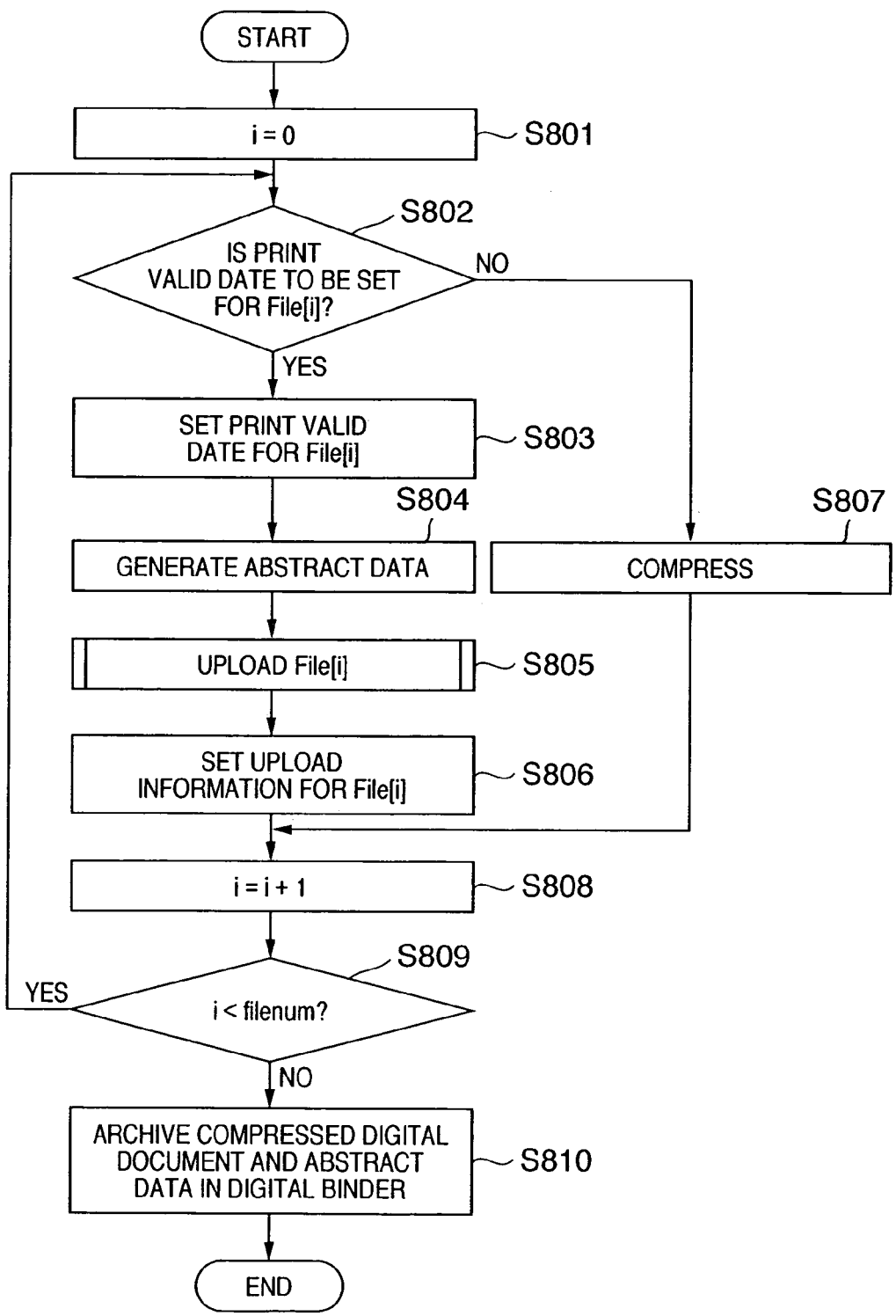
FIG. 8 is a flow chart showing a process for generating a digital binder by determining based on a valid date whether each digital document is to be stored in a digital binder or is to be uploaded to a server.

FIG. 8 is a flow chart showing a process for setting a print valid date for an arbitrary digital document on the basis of user's designation, generating abstract data of the document set with the print valid date so as to be archived in place of its original digital document, saving the digital document main body set with the print valid date to an external server, and generating a digital binder by archiving digital documents for which no print valid date is set and the abstract data, upon compressing and archiving digital documents as a digital binder.

In step 801, digital document number i is reset to zero to start a checking process from the first digital document.

It is checked in step 802 if it is designated to set a print valid date for digital document [i]. If it is determined that a print valid date is to be set, the flow advances to step 803; otherwise, the flow advances to step 807.

In step 803, a print valid date is set for target digital document [i].

In step 804, abstract data of digital document [i] set with the print valid date is generated.

In step 805, a main body of digital document [i] set with the print valid date is uploaded to an external server.

In step 806, information indicating that digital document [i] is uploaded and its abstract data is generated (including storage address information (link information) of the upload destination and the like) is appended to the digital binder.

In step 807, the digital document which is determined in step 802 not to be set with any print valid date is compressed using a predetermined compression algorithm.

In step 808, i is incremented by 1. The current digital document number i and the total number filenum of all digital files are compared in step 809 to check if all digital documents have been checked. If i<filenum, the flow returns to step 802 to repeat the process for the next digital document i. If i≦filenum, i.e., if it is determined that the checking processes of all the digital documents are complete, the flow advances to step 810.

In step 810, the digital binder is generated by archiving digital documents which are not set with any print valid date and the abstract data of digital documents set with print valid dates, and writing related information of respective digital documents and that of abstract data in the header field.

FIG. 9 is a flow chart showing a process executed when the user decompresses and prints the digital binder generated by the digital binder generation process shown in FIG. 8.

In step 901, digital document number i is reset to zero to start a checking process from the first digital document.

It is checked in step 902 if a print valid date is set for target digital document i. If a print valid date is set for digital document i, the flow advances to step 903; otherwise, the flow advances to step 906.

In step 903, an inquiry is sent to the external server to acquire the time from it so as to compare it with the print valid date of target digital document i.

It is checked in step 904 if the print valid date of target digital document i has expired. If the print valid date does not expire, the flow advances to step 905; otherwise, the flow jumps to step 908.

In step 905, target digital document i is downloaded from the external server.

On the other hand, if it is determined in step 902 that no print valid date is set for digital document i, it is determined that use of target digital document i is not limited. Then, compressed digital document i is extracted and separated from the digital binder in step 906. In step 907, compressed digital document i undergoes a decompression process using a decompression algorithm corresponding to the predetermined compression algorithm used in compression.

In step 908, i is incremented by 1.

In step 909, digital document i which is downloaded in step 905 or is decompressed in step 907 is printed. For a digital document which is determined in step 904 that its print valid date has expired, abstract data can be printed in place of original digital document i.

The current digital document number i and the total number filenum of files are compared in step 910 to check if all digital documents have been checked. If i<filenum, the flow returns to step 902 to check the next digital document i. If i≧filenum, it is determined that all the digital documents have undergone the compression/non-compression determination process, thus ending the process.

As has been explained using FIGS. 8 and 9, since a valid date is set for use of each digital document, the chances of inadvertent downloading of digital documents can be reduced, thus improving security.

<Process Associated with Digital Binder Given with File Size Limitation>

Figure 10:
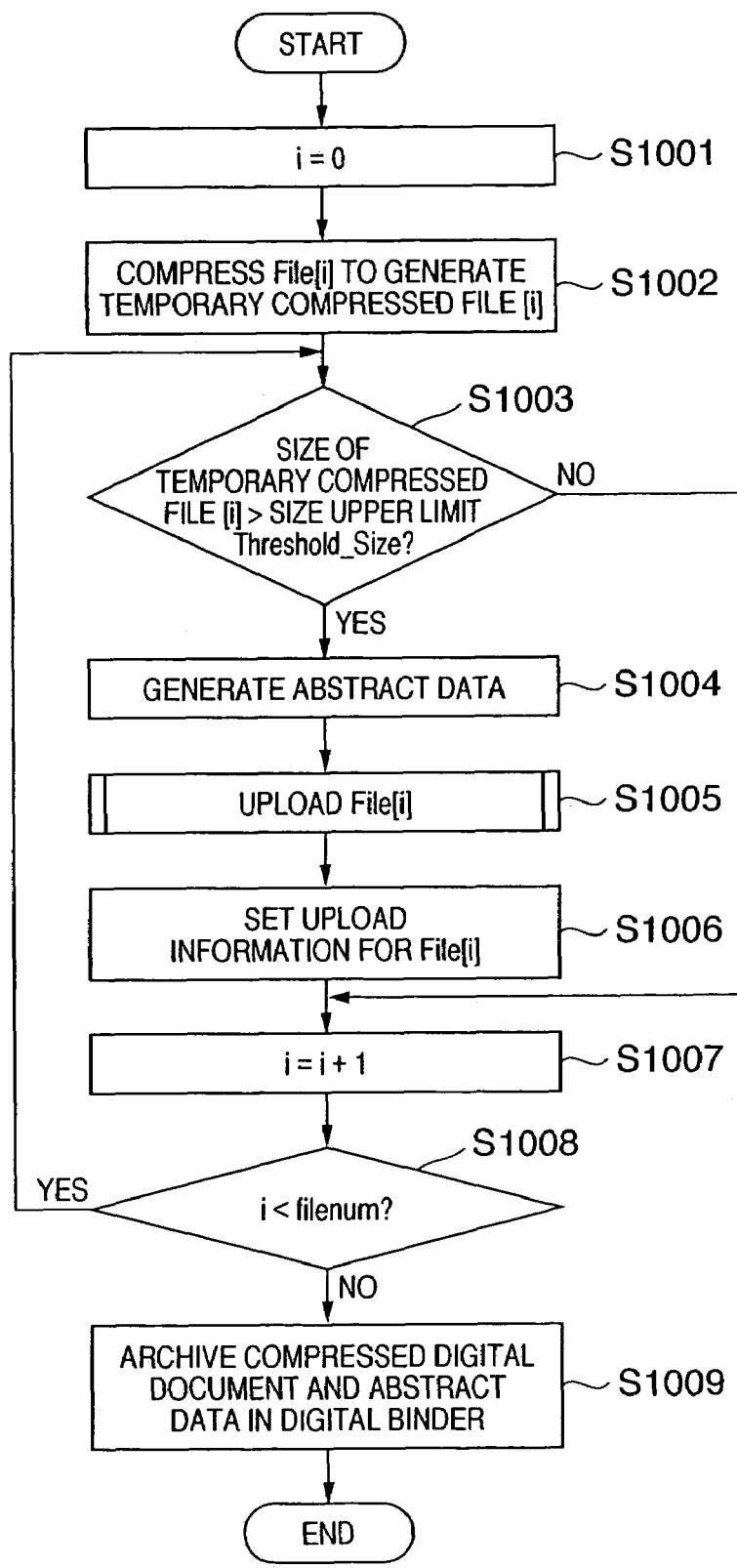
FIG. 10 is a flow chart showing a process for generating a digital binder by determining based on the file size of each digital document whether that digital document is to be stored in a digital binder or is to be uploaded to a server.

FIG. 10 is a flow chart showing a process for, when an administrator or the like sets a file size limitation of a digital document that can be archived by the user, and digital documents are to be compressed and archived as a digital binder, generating abstract data of a digital document with a file size larger than the limitation so as to be archived in place of an original digital document, saving that digital document main body in an external server, and generating a digital binder by archiving the abstract data and digital documents with sizes equal to or smaller than the file size limitation.

In step 1001, digital document number i is reset to zero to start a checking process from the first digital document.

In step 1002, target digital document i is compressed using a predetermined compression algorithm to generate temporary compressed digital document i.

In step 1003, file size Size_temp[i] of temporary compressed digital document i generated in step 1002 is compared with threshold value T_size of a file size which is set in advance by the administrator. If Size_temp[i]>T_size, it is determined that digital document i is too large to browse to recognize its contents, and the flow advances to step 1004. If Size_temp[i]≦T_size, it is determined that digital document i is allowed to browse, and the flow jumps to step 1007.

In step 1004, abstract data of digital document i which is determined in step 1003 to have too large a file size is generated.

In step 1005, a main body of digital document i is uploaded to the external server.

In step 1006, upload information (including storage address information of the upload destination and the like) indicating that digital document i is uploaded and its abstract data is generated is appended to the digital binder.

In step 1007, i is incremented by 1. The current digital document number i and the total number filenum of all digital files are compared in step 1008 to check if all digital documents have been checked. If i<filenum, the flow returns to step 1002 to execute a process for the next digital document i. If i≧filenum, it is determined that the checking processes for all the digital documents are complete, and the flow advances to step 1009.

In step 1009, a digital binder is generated by archiving compressed digital documents which have compressed file sizes equal to or smaller than the predetermined threshold value, and abstract data of digital documents larger than a predetermined file size, which are generated in step 1004.

Figure 11:
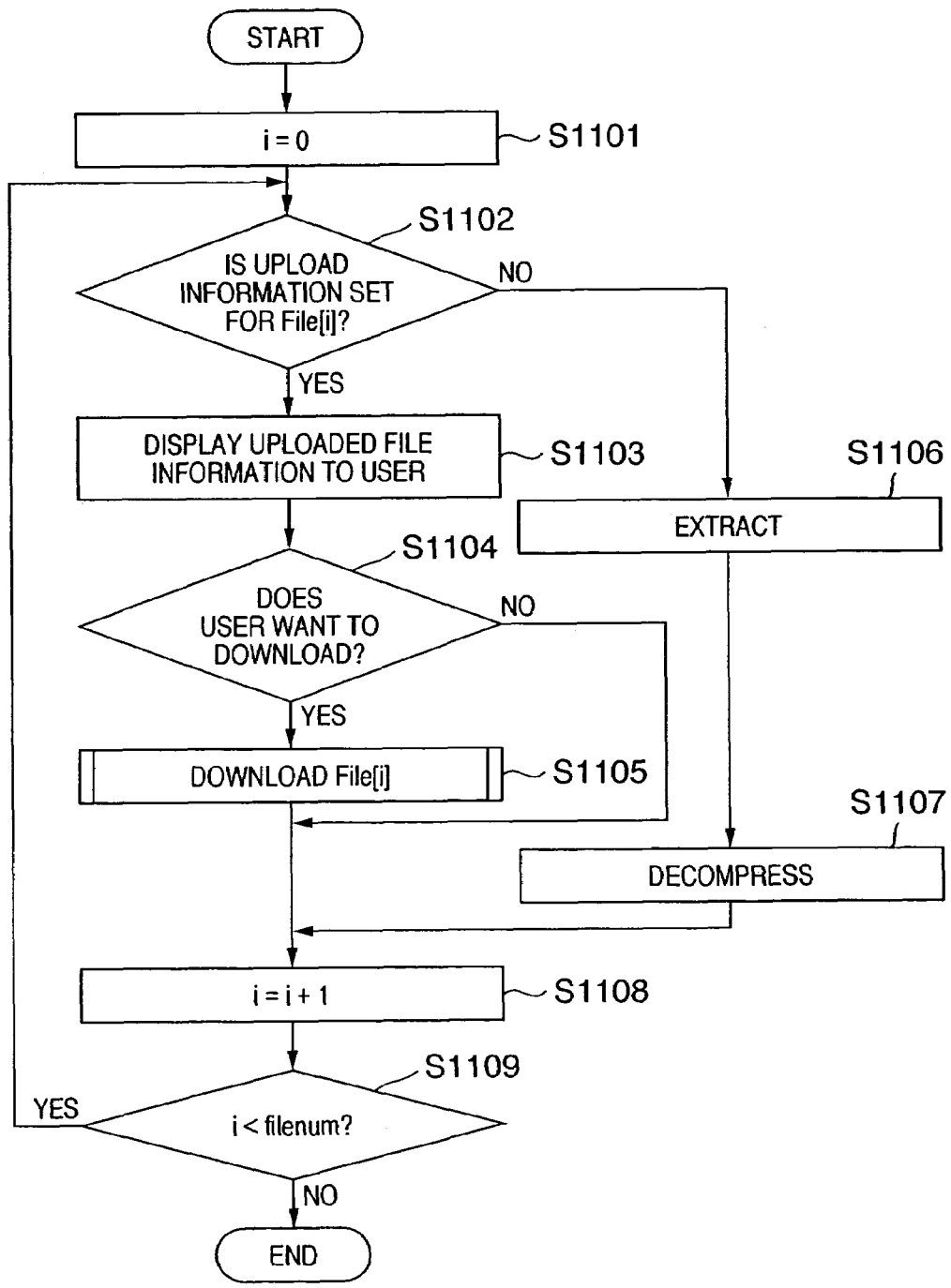
FIG. 11 is a flow chart upon downloading digital documents in the digital binder generated in FIG. 10.

FIG. 11 is a flow chart showing a process executed when the user decompresses and prints the digital binder generated by the digital binder generation process shown in FIG. 10.

In step 1101, digital document number i is reset to zero to start a checking process from the first digital document.

It is checked in step 1102 if upload information is registered in the digital binder in association with digital document i. If upload information is registered, the flow advances to step 1103. If no upload information is registered, it is determined that the digital binder includes the compressed digital document, and the flow advances to step 1106.

In step 1103, information (abstract or the like) associated with the uploaded file is presented to the user on the basis of the registered upload information.

It is confirmed in step 1104 if the user wants to download the presented file. If the user designates to download that file, the flow advances to step 1105 to download digital document i. On the other hand, if the user designates not to download that file, the flow jumps to step 1108.

In step 1106, archived compressed digital document i is extracted from the digital binder. In step 1107, compressed digital document i is decompressed to generate digital document i.

In step 1108, the digital document number is incremented by 1. The current digital document number i and the total number filenum of all digital files are compared in step 1109 to check if all digital documents have been checked. If i<filenum, the flow returns to step 1102 to repeat a process for the next digital document i. If i≧filenum, the checking processes for all the digital documents are complete.

As has been explained using FIGS. 10 and 11, since the file sizes of digital documents to be stored in the digital binder are limited, the file size of the digital binder itself can be prevented from becoming too large, and the digital binder can be easily handled.

As described above, according to the above embodiments, the security of the digital binder can be improved.

Also, according to the above embodiments, the file size of the digital binder can be prevented from becoming inadvertently large. Hence, the digital binder can be easily handled.

Furthermore, according to the above embodiments, a digital binder that includes unwanted digital documents can be prevented from being transmitted.

Moreover, according to the above embodiments, upon using an uploaded digital document, since the user can use the latest digital document which is uploaded to the server independently of the acquisition date and time of the digital binder, he or she need not re-acquire the digital binder, thus allowing easy maintenance.

<Arrangement of Information Processing Apparatus>

Figure 12:
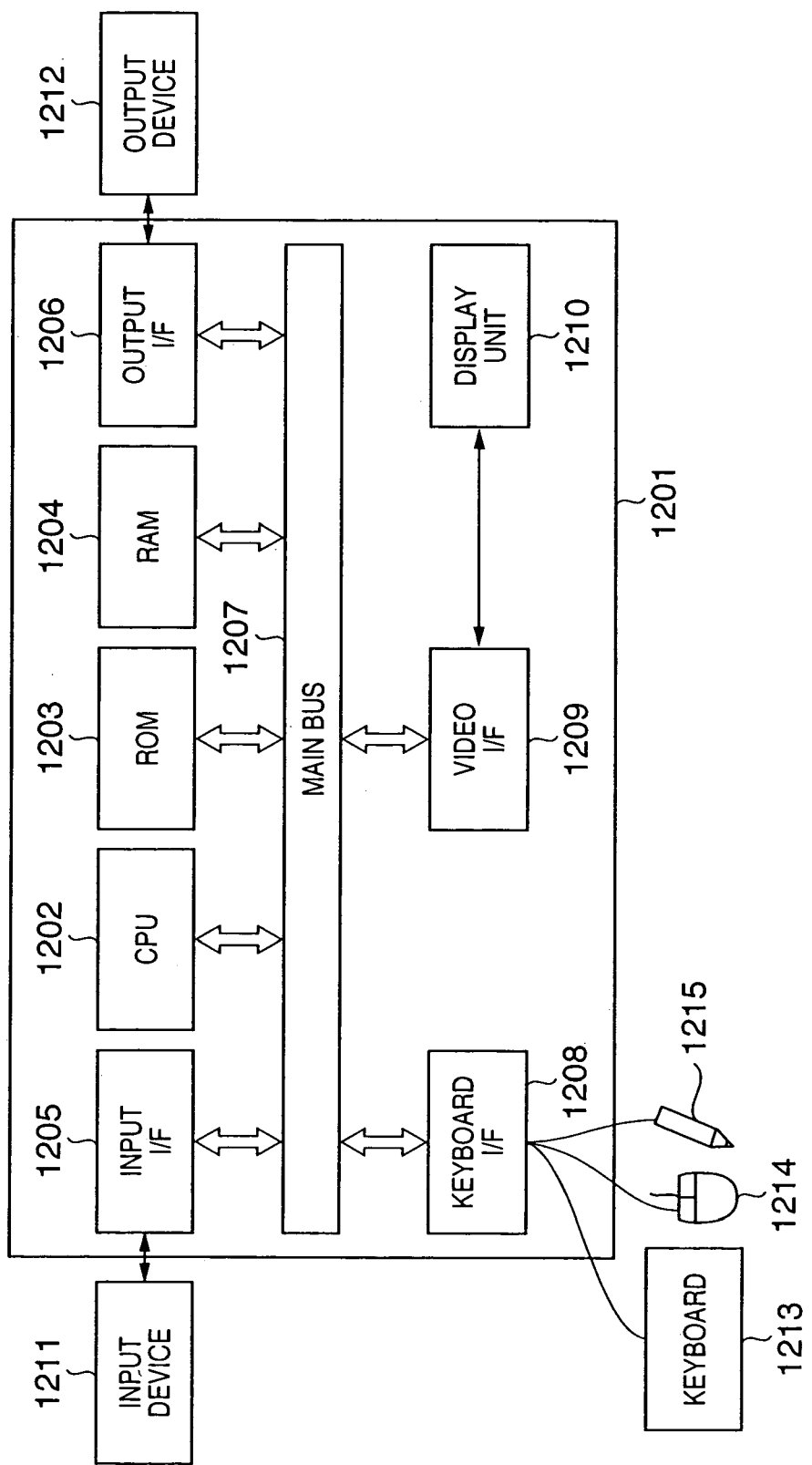
FIG. 12 is a block diagram showing the arrangement of an information processing apparatus which can be applied to the document management system according to an embodiment of the present invention.

FIG. 12 is a block diagram showing the arrangement of an information processing apparatus which can be applied to the document management system of the present invention. Note that the arrangement of the external server can adopt the same hardware arrangement as that shown in FIG. 12 except for the software configuration associated with the aforementioned processes.

Referring to FIG. 12, a CPU 1202 controls a whole information processing apparatus 1201 via a main bus 1207, and also an input device 1211 (e.g., an image scanner, a storage device, another information processing apparatus connected via a network, a facsimile connected via a telephone line, or the like) externally connected to the information processing apparatus 1201 via an input I/F (interface) 1205. Furthermore, the CPU 1202 controls an output device (e.g., a printer, monitor, another information processing apparatus connected via a network, a facsimile connected via a telephone line, or the like) externally connected to the information processing apparatus 1201 via an output I/F 1206. The CPU 1202 executes an image input process, image process, color conversion process, image output control, and the like in accordance with instructions input from an input unit (e.g., a keyboard 1213, pointing device 1214, and pen 1215) via a KBD I/F (keyboard interface) 1208. Moreover, the CPU 1202 controls a display unit 1210 that displays image data input by the input device 1211 or image data generated using the keyboard 1213, pointing device 1214, and pen 1215 via a video I/F 1209.

A ROM 1203 stores various control programs that make the CPU 1202 execute various kinds of control. These control programs may be stored in a hard disk drive (not shown). The control programs include a program corresponding to a flow chart of any one of FIGS. 2 to 4 and FIGS. 8 to 11.

On a RAM 1204, the CPU 1202 loads and executes an OS and other control program including those which are required to implement the present invention. Also, the RAM 1204 serves as various work areas and a temporary save area, which are used to execute the control programs. Furthermore, a VRAM (not shown) that temporarily holds image data input by the input device 1211 or image data generated using the keyboard 1213, pointing device 1214, and pen 1215 is assured on the RAM 1204.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An information processing method for generating an archive file that stores a plurality of various digital documents, comprising:
    a checking step of determining based on a predetermined reference whether each of the plurality of various digital documents is to be stored in a compressed or non-compressed state, wherein the plurality of various digital documents include a first digital document and a second digital document;
    a compressing step of generating compressed data for the first digital document when it is determined in said checking step that the first digital document is to be stored in a compressed state;
    a non-compressing step of generating non-compressed data for the second digital document when it is determined in said checking step that the second document is to be stored in a non-compressed state; and a generation step of generating the archive file that stores both the compressed first digital document and the non-compressed second digital document wherein the foregoing steps are executed by at least one computer processing unit.

2. The method according to claim 1, wherein the predetermined reference is an access frequency to each digital document, and wherein it is determined based on the access frequency in said checking step whether each of the plurality of various digital documents is to be stored in a compressed or non-compressed state.

3. The method according to claim 1, wherein the predetermined reference is a format of each digital document, and wherein it is determined based on the format of each digital document in said checking step whether each of the plurality of various digital documents is to be stored in a compressed or non-compressed state.

4. The method according to claim 1, wherein the predetermined reference is a compression ratio of each digital document, and wherein it is determined based on compression ratio of each digital document in said checking step whether each of the plurality of various digital documents is to be stored in a compressed or non-compressed state.

5. The method according to claim 1, further comprising an extraction step of extracting a digital document from the archive file generated in the generation step.

6. The method according to claim 1, further comprising an acquisition step of acquiring a desired digital document using a table, and wherein the table has location. information of each stored digital document, and is contained in the archive file.

7. A computer readable storage medium storing a computer program for causing a computer to execute the information processing method of claim 1.

8. The method according to claim 1, wherein the second digital document is decompressed in said non-compressing step when the second digital document has already been compressed, and wherein the second digital document is not compressed in said non-compressing step when the second digital document is already in a non-compressed state.

9. The method according to claim 1, wherein the first digital document is compressed in said compressing step when the first digital document is not compressed, and wherein the first digital document is not compressed in said compressing step when the first digital document is already compressed.

10. An information processing apparatus for generating an archive file that stores a plurality of various digital documents, comprising:

a checking unit that determines based on a predetermined reference whether each of the plurality of various digital documents is to be stored in a compressed or non-compressed state, wherein the plurality of various digital documents include a first digital document and a second digital document;

a compressing unit that generates compressed data for the first digital document when said checking unit determines that the first digital document is to be stored in a compressed state;

a non-compressing unit that generates non-compressed data for the second digital document when said checking unit determines that the second document is to be stored in a non-compressed state; and a generation unit which generates the archive file that stores both the compressed first digital document and the non-compressed second digital document.

11. The apparatus according to claim 10, wherein the predetermined reference is an access frequency to each digital document, and wherein said checking unit determines based on the access frequency whether each of the plurality of various digital documents is to be stored in a compressed or non-compressed state.

12. The apparatus according to claim 10, wherein the predetermined reference is a format of each digital document, and wherein said checking unit determines based on the format of each digital document whether each of the plurality of various digital documents is to be stored in a compressed or non-compressed state.

13. The apparatus according to claim 10, wherein the predetermined reference is a compression ratio upon compressing each digital document, and wherein said checking unit determines based on the compression ratio of each digital document whether each of the plurality of various digital documents is to be stored in a compressed or non-compressed state.

14. The apparatus according to claim 10, further comprising an extraction unit which extracts a digital document from the archive file generated by the generation unit.

15. The apparatus according to claim 10, further comprising an unit which acquires a desired digital document using a table, and wherein the table has location information of each stored digital document, and is contained in the archive file.

16. An information processing method for generating an archive file that stores a plurality of digital documents, comprising:

a checking step of determining based on a predetermined condition whether each digital document is to be uploaded to a server;

a compressing step of generating compressed data for a first digital document when it is determined in said checking step that the first digital document is not to be uploaded to a server;

an abstract generating step of generating non-compressed abstract data for a second digital document when it is determined in the checking step that the second digital document is to be uploaded;

an uploading step of uploading the second digital document, which is determined in the checking step to be uploaded, to the server; and an archive file generation step of generating an archive file which stores both the non-compressed abstract data of the second digital document which is determined in the checking step to be uploaded, and the compressed data for the first digital document which is determined in the checking step not to be uploaded, wherein the archive file does not store the main body of the second digital document which is determined in the checking step to be uploaded wherein the foregoing steps are executed by at least one computer processing unit.

17. The method according to claim 16, wherein the predetermined condition is used to check whether or not a digital document is set with a valid date.

18. The method according to claim 17, wherein the valid date is a print valid date.

19. The method according to claim 16, wherein the predetermined condition is used to check whether or not a file size of a digital document is larger than a predetermined threshold value.

20. The method according to claim 16, wherein the archive file generated in the archive file generation step stores information associated with the digital document which is uploaded to the server.

21. The method according to claim 16, further comprising a step of presenting the abstract data of the uploaded digital document to a user.

22. The method according to claim 16, further comprising a step of acquiring the uploaded digital document or a digital document stored in the archive file.

23. The method according to claim 22, wherein the acquisition step includes a step of acquiring a digital document designated by a user.

24. The method according to claim 16, further comprising a compression step of compressing a digital document, and wherein the digital document stored in the archive file generated in the archive file generation step is the digital document compressed in the compression step.

25. A computer readable medium storing a computer program for making a computer execute respective steps in an information processing method of claim 16.

26. A computer readable storage medium storing a computer program of claim 25.

27. An information processing apparatus for generating an archive file that stores a plurality of digital documents, comprising:
  a checking unit which determines based on a predetermined condition whether each digital document is to be uploaded to a server;
  a compressing unit that generates compressed data for a first digital document when it is determined by said checking unit that the first digital document is not to be uploaded to a server;
  an abstract generating unit which generates non-compressed abstract data for a second digital document when it is determined by the checking unit that the second digital document is to be uploaded;
  an uploading unit which uploads the second digital document, which is determined by the checking unit to be uploaded, to the server; and
  an archive file generation unit which generates an archive file which stores the non-compressed abstract data of the second digital document which is determined by the checking unit to be uploaded, and a the compressed data for the first digital document which is determined by the checking unit not to be uploaded, wherein the archive file does not store the main body of the second digital document which is determined by the checking unit to be uploaded.

28. The apparatus according to claim 27, wherein the predetermined condition is used to check whether or not a digital document is set with a valid date.

29. The apparatus according to claim 28, wherein the valid date is a print valid date.

30. The apparatus according to claim 27, wherein the predetermined condition is used to check whether or not a file size of a digital document is larger than a predetermined threshold value.

31. The apparatus according to claim 27, wherein the archive file generated by the archive file generation unit stores information associated with the digital document which is uploaded to the server.

32. The apparatus according to claim 27, further comprising a unit which presents the abstract data of the uploaded digital document to a user.

33. The apparatus according to claim 27, further comprising a unit which acquires the uploaded digital document or a digital document stored in the archive file.

34. The apparatus according to claim 33, wherein the acquisition unit includes a unit which acquires a digital document designated by a user.

35. The apparatus according to claim 27, further comprising a unit which compresses a digital document, and wherein the digital document stored in the archive file generated by the archive file generation unit is the digital document compressed in the compression unit.

* * * * *